United States Patent
Edwards et al.

(10) Patent No.: US 12,413,671 B2
(45) Date of Patent: Sep. 9, 2025

(54) COMPUTER-BASED SYSTEMS CONFIGURED TO MONITOR A COMMUNICATION SESSION AND GENERATE A TRAINING SESSION AND METHODS OF USE THEREOF

(71) Applicant: Capital One Services, LLC, McLean, VA (US)

(72) Inventors: Joshua Edwards, Philadelphia, PA (US); Alexander Lin, San Francisco, CA (US); Mia Rodriguez, Broomfield, CO (US); Guadalupe Bonilla, Hyattsville, MD (US); Aysu Ezen Can, Cary, NC (US); Michael Mossoba, Great Falls, VA (US); Feng Qiu, West Chester, PA (US); Tyler Maiman, Melville, NY (US); Meredith L. Critzer, Midlothian, VA (US)

(73) Assignee: Capital One Services, LLC, McLean, VA (US)

( * ) Notice: Subject to any disclaimer, the term of this patent is extended or adjusted under 35 U.S.C. 154(b) by 225 days.

(21) Appl. No.: 18/450,886

(22) Filed: Aug. 16, 2023

(65) Prior Publication Data
US 2025/0063118 A1    Feb. 20, 2025

(51) Int. Cl.
*H04M 3/00* (2024.01)
*G10L 15/18* (2013.01)
*G10L 15/22* (2006.01)
*H04M 3/51* (2006.01)

(52) U.S. Cl.
CPC ....... *H04M 3/5175* (2013.01); *G10L 15/1815* (2013.01); *G10L 15/22* (2013.01); *H04M 2201/39* (2013.01); *H04M 2201/40* (2013.01); *H04M 2203/403* (2013.01)

(58) Field of Classification Search
CPC ... H04M 3/5175; G10L 15/1815; G10L 15/22
See application file for complete search history.

(56) References Cited

U.S. PATENT DOCUMENTS

| | | |
|---|---|---|
| 10,490,191 B1 | 11/2019 | Benkreira et al. |
| 2006/0248406 A1* | 11/2006 | Qing ........................ G06F 8/31 714/38.14 |
| 2019/0355042 A1 | 11/2019 | Swierk et al. |
| 2019/0385609 A1 | 12/2019 | Olabiyi et al. |

* cited by examiner

*Primary Examiner* — Rasha S Al Aubaidi
(74) *Attorney, Agent, or Firm* — Greenberg Traurig, LLP

(57) ABSTRACT

In some embodiments, the present disclosure provides an exemplary method that may include steps of monitoring, a conversation script between a call center agent and a customer; utilizing, a speech-to-text deep machine learning model to transcribe the audio call to text; utilizing, a natural language processing deep machine learning model to map intent mappings of the audio call; utilizing, a similarity measurement model to determine a semantic similarity between predefined intent mappings and the intent mappings of the call audio text; determining, an error based on the semantic similarity in the intent mapping call audio text; determining a training session based on the error.

21 Claims, 4 Drawing Sheets

COMPUTER-BASED SYSTEMS
CONFIGURED TO MONITOR A
COMMUNICATION SESSION AND
GENERATE A TRAINING SESSION AND
METHODS OF USE THEREOF

FIELD OF TECHNOLOGY

The present disclosure generally relates to computer-based systems configured to automatically monitor a communication interaction session in real-time and automatically generate a training interaction action and methods of use thereof.

BACKGROUND OF TECHNOLOGY

Typically, a call center agent receives training on correct dialogue for certain response paradigms when engaging with customers. Further, the language that call center agents use with regards to customers is subject to rules, regulations, and laws set out by Federal, State, and local governing bodies. In certain situations, a caller with ill intent attempts to direct the call center agent to respond precipitously, directing the agent off the correct dialogue. Once off correct dialog, the caller has achieved their goal, redirecting the call center agent. Thus, it is imperative that call center agents undergo regular training and subsequent training sessions to stay-up-to-date with organizational protocols for correct dialogue use.

SUMMARY OF DESCRIBED SUBJECT MATTER

In some embodiments, the present disclosure provides an exemplary technically improved computer-based method that includes at least the following steps: retrieving, by at least one processor, a predefined call script from a predefined call script library, the predefined call script having predefined intent mappings encoding predefined text representing predefined correct dialogue associated with a sample topic; utilizing, by the at least one processor, an illustrative computer-based monitoring module to detect an error in a call script conversation based at least in part on the predefined call script; wherein the illustrative computer-based monitoring module is configured to: utilize at least one speech-to-text deep machine learning model to transcribe a call script conversation comprising text representative of the call script conversation; utilizing, by at least one processor, at least one natural language processing deep machine learning model to generate a plurality of call intent mappings associated from the script conversation, wherein the at least one natural language processing deep machine learning model comprises a plurality of parameters configured to encode the text of the call script into the plurality of call intent mappings to produce semantic encodings indicative of call script; utilizing, by the at least one processor, at least one similarity measurement model to determine a semantic similarity between the predefined intent mappings and the plurality of call intent mappings based at least in part on at least one similarity measure; determining, based on the semantic similarity, at least one error in at least one call intent mapping of the plurality of call intent mappings; determining, by the at least one processor, a user training need based at least in part on the at least one error; selecting, by the at least one processor, training data for a training call based at least in part on the at least one error and the script conversation; selecting, by the at least one processor, a training call voice for the training call based at least in part on the training data; initiating, by the at least one processor, the training call by calling a user and loading the training data in a user dashboard of a user computing device associated with the user; utilizing, by the at least one processor, a call generation module to automatically generate caller speech for the training call based at least in part on the training data and the training call voice; wherein the call generation module is configured to: receive user speech data representative of speech performed by a user during the training call in response to the generated caller speech; utilizing, by the at least one processor, the at least one speech-to-text deep machine learning model to transcribe a user speech script representative of the user speech data;
utilizing, by the at least one processor, the at least one natural language processing deep machine learning model to generate at least one user speech intent mapping associated with the user speech data; detecting, by the at least one processor, a new error in the user speech script based at least in part on the call script and the user speech script; determining, by the at least one processor, a user training need based at least in part on, the at least one new error; and determining, by the at least one processor, a training session initiation based at least in part on the user training need and the at least one new error.

BRIEF DESCRIPTION OF DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

DETAILED DESCRIPTION

Figure 1:
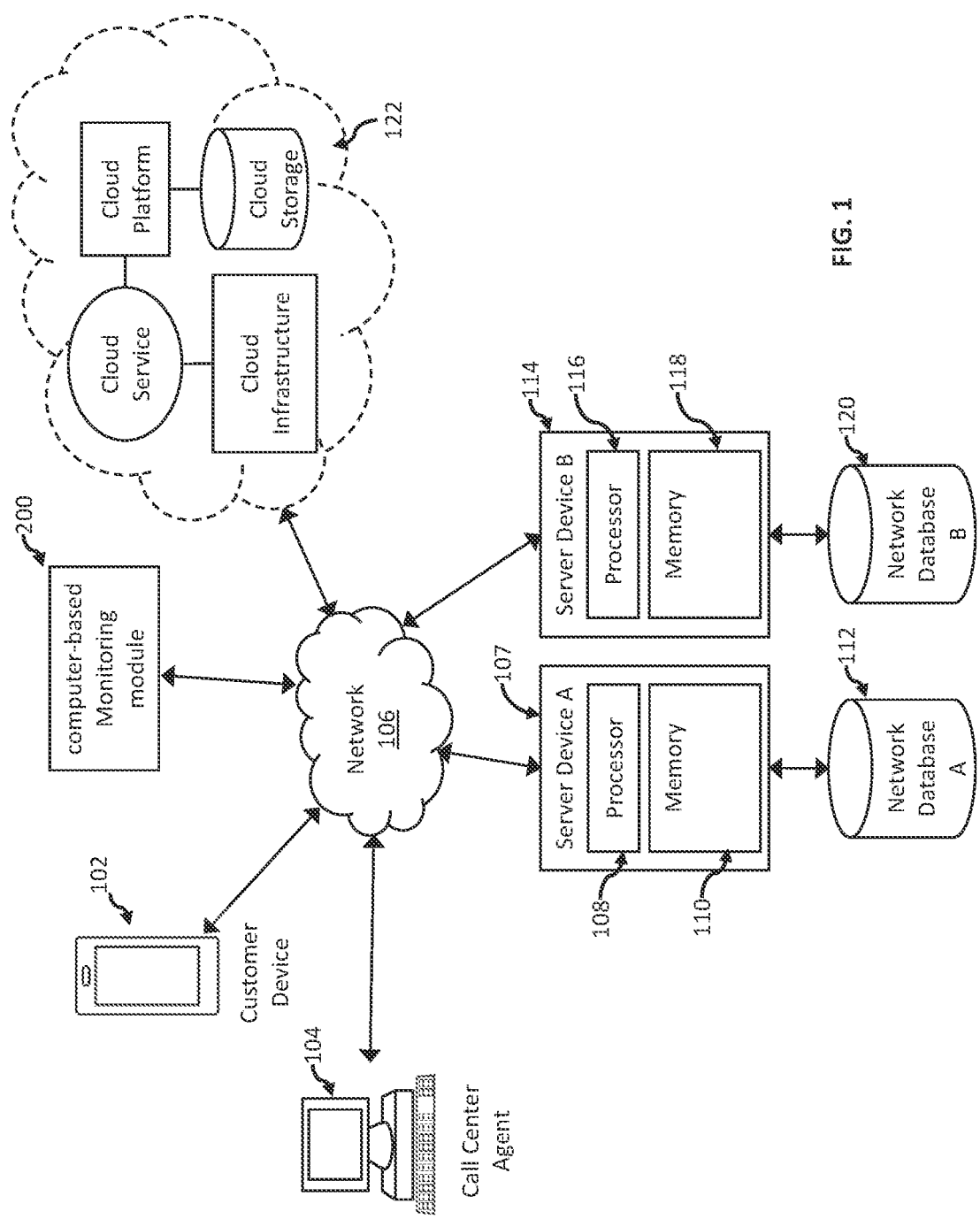
FIG. 1 depicts an illustration of an exemplary computer-based system and platform configured to monitor a communication interaction in real-time and automatically generate a training interaction session, in accordance with one or more embodiments of the present disclosure.

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the terms "and" and "or" may be used interchangeably to refer to a set of items in both the conjunctive and disjunctive in order to encompass the full description of combinations and alternatives of the items. By way of example, a set of items may be listed with the disjunctive "or", or with the conjunction "and." In either case, the set is to be interpreted as meaning each of the items singularly as alternatives, as well as any combination of the listed items.

It is understood that at least one aspect/functionality of various embodiments described herein can be performed in real-time and/or automatically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a creator interacting with an application on a mobile device) occurs, in order that results of the computation can be used in guiding the physical process.

As used herein, the term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, daily, several days, weekly, monthly, etc.

As used herein, the term "runtime" corresponds to any behavior that is dynamically determined during an execution of a software application or at least a portion of software application.

In some embodiments, the present disclosure may utilize a natural language processing algorithm to automatically generate at least one interaction notification for transmission to a particular computing device, where the interaction notification may refer to a detailed communication script associated with the repetitive interaction session. In some embodiments, the present disclosure may obtain a permission from each user to monitor a plurality of activities within the computing device. In some embodiments, the present disclosure may continually receive monitoring data of the plurality of activities for a predetermined period of time. In some embodiments, the present disclosure may identify a plurality of related incoming interaction sessions being initiated within the predetermined period of time by the computing device associated with the user. In some embodiments, the present disclosure may automatically verify a common session parameter associated with the incoming interaction session to identify the incoming interactive session as a repetitive interaction session. In some embodiments, the at least one technological computer-centered solution associated with the illustrative technological computer-centered problem may be a utilization of a deep machine learning algorithm to determine that at least one communication interaction session associated with at least one computing device associated with the individual based on a common session parameter. In some embodiments, the illustrative trained deep machine learning module may refer to the trained deep machine learning algorithm trained using an unsupervised learning and/or a semi-supervised learning for the predetermined period of time. For example, the deep machine learning module may include at least one of regression algorithm, instance-based algorithm, regularization algorithm, decision tree algorithm, Bayesian algorithm, clustering algorithm, associated rule learning algorithm, deep learning algorithm, dimensionality reduction algorithm, ensemble algorithm, and/or artificial neural network algorithm.

Currently a significant number of business operations use computer-based deep machine learning algorithms to significantly increase efficiency in relation to communication interactions between customers and service providers. For example, a business may use a computer-based deep machine learning system to screen out scam/unwanted calls. The business may train the computer-based deep machine learning algorithm on known data sets of phone numbers associated with a scam/unwanted call, or identify and collect their own database of phone numbers associated with a scam/unwanted call. The training datasets can be used to predict whether an incoming call is likely a scam/unwanted call. This increases business efficiency as only the calls that are related to business matters are answered by the business representative.

Many businesses employee the use of computer-based deep machine learning algorithms as a first interface with a customer in the form of a chat-bot. The chat-bot can be initially trained on datasets of chats stored from previous customer/service provider sessions and over-time the algorithm improves in terms of its ability to predict semantic context of phrases, literally learning the business lingo of the business in order to better serve customers.

Embodiments of the present disclosure recognize at least one technological computer-centered problem associated with preferred actions and associated correct dialog during a call session of a call center agent and a customer. An existing potential risk associated with attempting to resolve a customer's issue during a call session, such as remaining compliant with company protocols, treating customers equitably and fairly during the call session.

The illustrative technological computer-centered problem may also arise during an interaction communication session between a malicious actor and a call center agent such as where the malicious actor attempts to distract the call center agent in order to deter the call center agent from adhering to organizational protocol and associated steps for the interaction communication session.

As detailed in at least some embodiments herein, at least one technological computer-centered solution associated with the illustrative technological computer-centered problem may be an illustrative system for automatically monitoring one or more communication interactions. In some embodiments, a communication interaction may be a call session in real-time and the illustrative system may be configured to automatically generate during the call session at least one training interaction action, and initiate a subsequent training session, in accordance with one or more embodiments of the present disclosure. In some embodiments, the illustrative system may automatically generate training call data, generate a voice for the training call, load the training data into a console of the call center agent and place a call to the call center agent training the agent on correct dialog to use with a customer.

In some embodiments, the illustrative system for monitoring a communication interaction having at least one computer accessing at least one database may be in communication with at least one network, where the network may provide a connection between a plurality of devices such as a device operated by a call center agent, a customer device, the manner in which the network connection is made may include a telephone line, a dial-up connection through a modem of a computing device, a wireless connection (e.g., WAN, LAN) a fiber optic connection, or a satellite connection or any number of devices capable of providing a digital or analog connection. In some embodiments, the network may also be in communication with a cloud computing platform providing connectivity to the at least one computer. In some embodiments, the network may be in communication with an illustrative computer-based monitoring module providing connectivity to the at least one computer. In some embodiments, the illustrative computer-based monitoring module may be configured to operate in the cloud platform, the computing system, or any plurality of devices capable of carrying out the operations of the illustrative computer-based monitoring module.

As detailed in at least some embodiments herein, at least one technological computer-centered solution associated with the illustrative technological computer-centered problem may be a utilization of an illustrative computer-based monitoring module having at least one deep machine learning sub-module utilizing, for example, without limitations, speech-to-text machine learning algorithms to convert user's (e.g., customer's) speech to text. In some embodiments the illustrative computer-based monitoring module capable of determining at least one intent mapping in a conversation with at least one customer and at least one call center agent associated with at least one computing device. In some embodiments, intent mappings based on semantic encoding may be utilized for training data such as for predefined scripts for the at least one deep machine learning algorithm in training episodes for call center agents.

In some embodiments the at least one deep machine learning sub-module of the computer-based monitoring module may be a natural language processing module, the module may include at least one input layer, at least one hidden layer, and at least one output layer receiving the at least one deep machine learning sub-module processing as input text of a call script conversation. The at least one deep machine learning sub-module processing through a numerical optimization of weights and connections of the at least one hidden layer deriving an output layer representing semantic encodings of intent mappings based on the text of the call script conversation. The at least one processor of the computer-based monitoring module measuring by a similarity measure, the semantic encodings of intent mappings of the call script conversation and the intent mappings of a predefined call script. The at least one processor of the computer-based monitoring module detecting an error when the similarity of the intent mappings in the call script conversation compared to the intent mappings of the predefined call script is low.

In some embodiments, the intent mappings related to the error detected by the similarity measure may be utilized by the at least one processor to determine a conversation topic of a training session for a call center agent as will be described in more detail below.

In some embodiments the at least one deep machine learning sub-module of the computer-based monitoring module may be a generative adversarial network (GAN) module. The GAN module may be trained on predefined adversarial call script text. The predefined adversarial call script text (further described below) may be text associated intent mappings identified as manipulative, attempting to re-direct a conversation topic off correct dialogue. The GAN module may include at least one input layer, at least one hidden layer, and at least one output layer receiving the at least one deep machine learning sub-module processing as input text of a call script conversation. The at least one deep machine learning sub-module processing through a numerical optimization of weights and connections of the at least one hidden layer deriving an output layer representing semantic encodings of intent mappings based on the text of the call script conversation. The at least one processor of the computer-based monitoring module measuring by a similarity measure, the semantic encodings of intent mappings of the call script conversation and the intent mappings of a predefined adversarial call script. The at least one processor of the computer-based monitoring module detecting an error when the similarity of the intent mappings in the call script conversation compared to the intent mappings of the predefined adversarial call script is low.

In some embodiments, the adversarial intent mappings related to the error detected by the similarity measure may be utilized by the at least one processor to determine a conversation topic of a training session for a call center agent as will be described in more detail below.

In some embodiments the computer-based monitoring module having at least one deep machine learning sub-module may automatically monitor call sessions between the agent and the caller, and may produce semantic encodings of intent mappings based, at least in part, on the transcribed speech to text data to be utilized for training data.

In some embodiments, the computer-based monitoring module having at least one deep machine learning sub-module automatically monitors call session(s) between the agent and the caller, and may automatically generate interaction prompt(s) for the agent in real-time.

In some embodiments, a call session may occur in the following manner where a call is received by a call center agent, and the computer-based monitoring module monitors the call. The computer-based monitoring module utilizing a deep machine learning algorithm transcribes the speech to text. The monitoring computer-based module then passes the text to an intent mapping deep machine learning algorithm to determine based on the call session the intent mapping and produce a semantic encoding of the intent mapping.

In some embodiments, the at least one deep machine learning sub-module of the computer-based monitoring module determines intent mapping(s) of a call session by grouping conversations. In some embodiments, a grouping may be at least one of a string of text, a sentence, an entire conversation or multiple conversation interactions. In some embodiments, the intent mapping(s) based on a grouping may occur when a call is received by the agent, and the computer-based monitoring module monitors the call. In some embodiments, the computer-based monitoring module utilizing a deep machine learning sub-module may transcribe the speech to text. In some embodiments, the computer-based monitoring module then may pass the text to an illustrative intent mapping(s) deep machine learning module to determine based on the communication interaction session the intent mapping(s) of the grouping.

In some embodiments, the at least one processor determines weight values to apply to conversation topics. The weight values may be applied where certain conversation topics are correlated with errors. In some embodiments, the weight values may be determined by at least one of a deep machine learning sub-module of the computer-based monitoring module, and passed to the at least one processor to apply to conversation topics. In some embodiments the initiation of a training session may at least in part be based on the weight value applied to the conversation topics.

In some embodiments, the computer-based monitoring module having at least one deep machine learning sub-module may determine intent mapping(s) of a grouping of a communication interaction session in part by a predetermined key word(s). In some embodiments, the predetermined key word(s) of the intent mapping(s) grouping may be weighted to increase or decrease the likelihood of specific intent mapping(s) groupings being associated with that key word(s).

In some embodiments, the computer-based monitoring module having at least one deep machine learning sub-module may determine an error of a communication interaction session in any of the following manner: the computer-based monitoring module may detect an error when the intent mapping(s) exceeds a difference (e.g., threshold, standard deviation, boundary condition, minimization function) from the preferred intent mapping(s) (e.g., vector, state-space, etc.) determined by the computer-based monitoring module.

In some embodiments, upon detection of the error, the computer-based monitoring module sends a prompt to the call center agent console, the prompt may be an instant message, text message, a phone call or any form of communication. The prompt sent by the computer-based monitoring module informs the agent that the communication interaction session with the customer is not correct and prompts the agent with the correct dialogue to redirect the conversation to the correct dialogue.

According to some embodiments, the agent receives a communication interaction prompt from the computer-based monitoring module and determines to follow the prompt. In this instance, the computer-based monitoring module automatically monitoring the conversation updates the intent mapping(s) based in real time on the determined communication interaction redirection and automatically adjusts the prompts based on the customer responses to the computer-based monitoring module intent mapping(s) prompts.

In some embodiments, the agent may determine to not follow the prompts generated by the computer-based monitoring module. In some instances, the computer-based monitoring module may determine an incorrect intent mapping(s), and determine an incorrect prompt. For example a customer may have just moved to a new address, and the computer-based monitoring module detects a location discrepancy with the customer address data on file. In this case, the intent mapping(s) may mistakenly determine the customer as potentially a malicious actor.

In some embodiments, the computer-based monitoring module with at least one deep machine learning sub-module determines the accuracy of the response to prompts by the agent. In some embodiments where the responses to prompts by the agent are determined to be accurate the computer-based monitoring module collates the communication interaction session data into a training data set to be utilized by the at least one deep machine learning algorithm of the computer-based monitoring module to predict the accuracy of responses in future communication interaction sessions.

In some embodiments the computer-based monitoring module with at least one deep machine learning sub-module determines that a response(s) to a prompt is inaccurate and determines that a subsequent training session should be initiated for the agent. The subsequent training session may be generated by a generative adversarial network (GAN) module having at least one deep neural network machine learning algorithm trained on the communication interaction sessions determined to be inaccurate responses by the agent. The data used to train the generative adversarial network (GAN) module is not limited to data from communication interaction sessions, but may be from any source, generated by any means thereof. In some embodiments, the computer-based monitoring module aggregates the communication interaction session data for training a generative adversarial network (GAN) module, developing related intent mapping(s) data sets for re-directing a conversation with malicious intent.

In some embodiments, a subsequent training session may be initiated when at least one deep machine learning sub-module determines at least one error in a call script conversation. In some embodiments at least one error may be determined when the duration of a call exceeds a predetermined length of time, or when the duration of the call exceeds an average length of a call.

In some embodiments, a subsequent training session is generated by a generative adversarial network module (GAN module) having at least one machine learning algorithm in the following manner. The computer-based monitoring module generates by the at least one processor an identity of a caller and stores the record in the call center database making the record available to all call center agents. The caller identity data is comprised of data that would be available to the agent during a communication interaction session with a customer (e.g., name, address, date of birth, social security number, account details). A call generation module having at least one deep machine learning algorithm, based on the caller identity data generates a voice for the virtual caller. The voice characteristics of the virtual caller being determined by a number of factors, but not limited to age, gender, education level, demographic, regional dialect, and socioeconomic status. In some embodiments, the GAN module generates text based on the previously collected incorrect responses provided by the agent to the call generation module. In some embodiments the call generation module sends the virtual caller identity data to the console of the call center agent, however, any sub-module of the computer-based monitoring module that operates similarly may be used to send the data to the console. In some embodiments, the call generation module transcribes this text to speech and performs the conversation with the agent utilizing the virtual voice. In some embodiments, at least one natural language deep machine learning sub-module may utilize a GAN module to transcribe replies of the agent from speech to text and in real time determine a subsequent malicious re-direct text to be delivered to the agent. Upon determining which text to deliver to the agent, the call generation module utilizing at least one processor transcribes the text into the voice of the previously determined virtual voice of the virtual caller.

In some embodiments, the GAN module iterates through a series of malicious re-direct conversations based on weighted intent mapping(s) response patterns from previously collected data. In some embodiments, the GAN module generates entirely unique malicious re-direct intent mapping(s) and produces a semantic encoding of the text to be delivered to the console of the agent. In some embodiments, any data capable of testing response patterns of an agent could be used by the GAN module. In some embodiments, the computer-based monitoring module having at least one deep machine learning algorithm generates the malicious re-direct intent mapping(s) semantic encoding text, the caller identity, the voice for the virtual caller and places the subsequent training call to the agent.

In some embodiments, the computer-based monitoring module having at least one deep machine learning algorithm sub-module randomly initiates a training session with an agent for compliance training. In some embodiments the training session is initiated when the computer-based monitoring module determines that a threshold error for agent communication interaction session errors has been exceeded. The determination to initiate a training session is not limited to a threshold measure (e.g., threshold, standard deviation, average, score, rank) any measure that provides meaningful improvement in training of an agent is acceptable. In some embodiments the training session may be initiated by at least one of the sub-modules of the computer-based monitoring module. The determination to initiate a training session may be initiated at any point by an administrator of the system. The administrator of the system may determine and schedule training initiation on a calendar basis.

FIG. 1 depicts an exemplary illustration of a computer-based system and platform for automatically monitoring a communication interaction session in real-time and automatically generating a training interaction action, in accordance with one or more embodiments of the present disclosure.

In some embodiments, of the present disclosure in FIG. 1 may include a customer device 102 and at least one device of a call center agent 104. The customer device 102, and the device of the call center agent 104 may refer to a smart phone, smart tablet, laptop, or any computing device capable of performing the plurality of activities over the network 106.

In some embodiments, the computer-based monitoring module 200 may operate on the computing device 107 or 114, it may operate on the device of a call center agent 104, or it may operate as a virtual machine in the network 106. According to some embodiments the computer-based monitoring module 200 may operate on computing device 107 the computing device 114, or may operate on a virtual machine in the cloud platform 122.

According to some embodiments of the exemplary implementations of the cloud platform 122 of FIG. 1 depict exemplary inventive computer-based systems/platforms, the exemplary inventive computer-based devices, and/or the exemplary inventive computer-based components of the present disclosure may be specifically configured to operate. In some embodiments the cloud platform 122 illustrates an exemplary system specifically configured to operate in a cloud platform such as, but not limiting to: infrastructure as a service (IaaS), platform as a service (PaaS), and/or software as a service (SaaS).

In some embodiments, the computer-based monitoring module 200 may be stored on the computing device 107, which may include a processor 108, a non-transient memory 110, communicatively connected to a network database A 112, a network database B 120 and communication circuitry for communicating over a communication network (not shown), and input and/or output (I/O) devices such as a keyboard, mouse, a touchscreen, and/or a display, (not shown) for example. In some embodiments the computer-based monitoring module 200 may be stored on multiple computing devices, for example computing device 107 and computing device 114, wherein each computing device is capable of carrying out the plurality of operations of the computer-based monitoring module 200. In some embodiments the computer-based monitoring module 200 is stored on the cloud platform 122, the plurality of operations of the computer-based monitoring module 200 carried out by virtual machines in the cloud platform 122.

In some embodiments, the computing device of the call center agent 104 may refer to at least one calling-enabled computing device of a plurality of calling-enabled computing devices. For example, the computing device of the call center agent 104 is a mobile device, a smart phone, and/or a laptop. In some instances, the computing device of the call center agent 104 may be the at least one calling-enabled computing device with an ability to execute a plurality of activities. In some instances, at least one activity of the plurality of activities may refer to an ability to initiate an interaction session with an external computing device. In some embodiments, the at least one activity of the plurality of activities may operate discreetly during the execution of at least one other activity of the plurality of activities. For example, the at least one activity operates in the background of the computing device of the call center agent 104. In some embodiments, the computing device of the call center agent 104 is capable of communicating with the customer device 102 communicatively connected to the network 106. In some embodiments the computer-based monitoring module 200 operating in any of a network 106, a computing device 107, a computing device 114, or a cloud platform 122 is capable of monitoring a plurality of communications between a customer device 102 and a computing device of the call center agent 104 during a communication interaction session.

In some embodiments, the illustrative computer-based monitoring module 200 may be configured to instruct the processor 108 to execute one or more software modules such as, without limitation, at least one deep machine learning sub-module, a speech to text learning model, an intent mapping(s) deep machine learning module, a GAN module 217.

Figure 2:
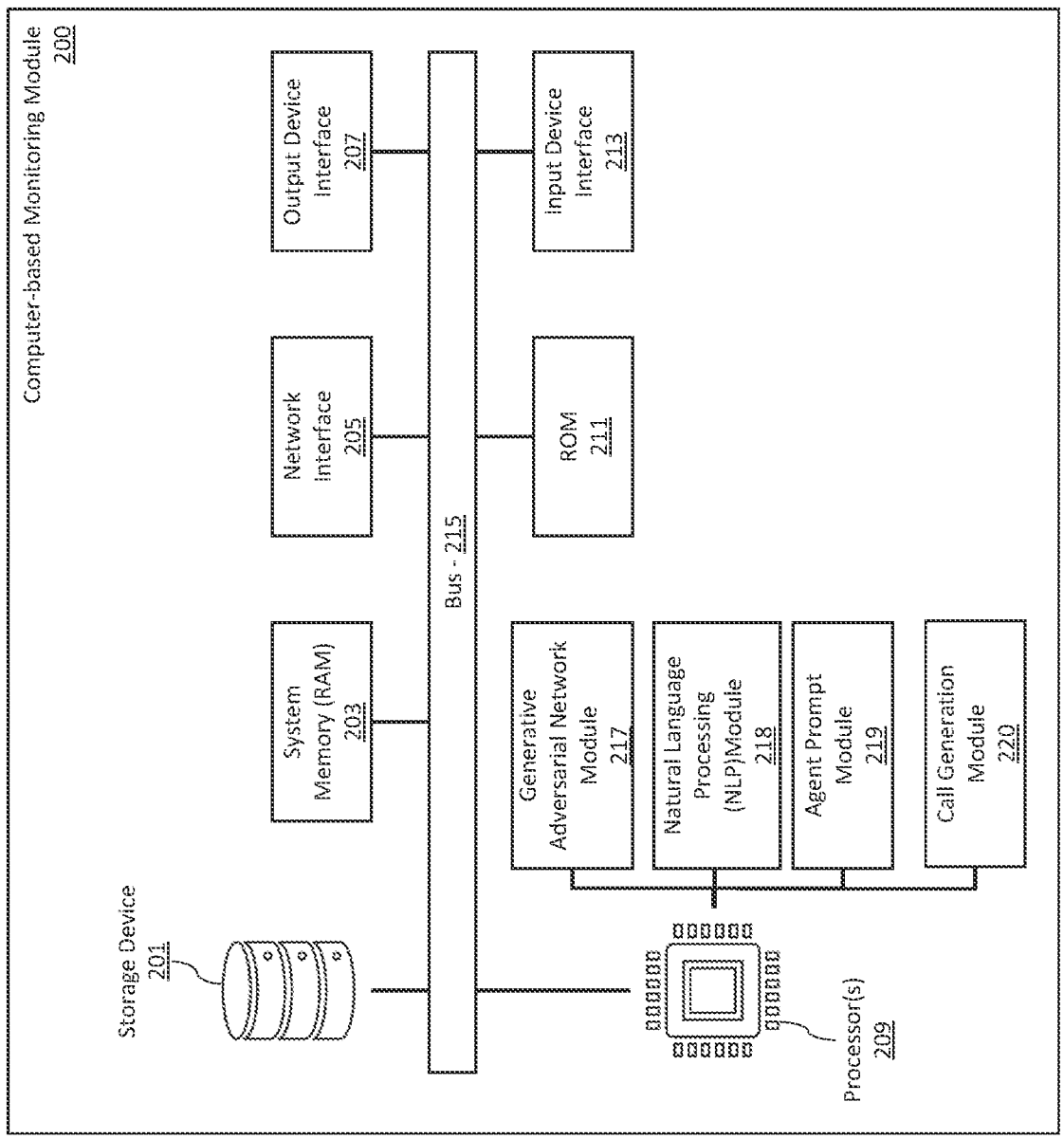
FIG. 2 depicts a block diagram of an exemplary computer-based monitoring module for monitoring a communication interaction in accordance with one or more embodiments of the present disclosure.

FIG. 2 depicts an exemplary block diagram of a computer-based monitoring module 200 and sub-modules according to some embodiments. The computer-based monitoring module 200 of FIG. 2 is a non-limiting example of a system capable of storing and processing at least one deep machine learning algorithm sub-module for monitoring the communication interaction session. In some embodiments, the computer-based monitoring module 200 having a network interface 205 communicatively coupled to a bus 215 capable of transmitting data of a communication interaction session, at least one input device interface 213 (e.g., keyboard, mouse) for inputting information, at least one output device interface 207 (e.g., screen) for viewing the output, at least one system memory (RAM) 203 and at least one ROM 211 for storing access memory, at least one storage device 201 for storing a plurality of communication interaction sessions, a GAN module 217, a natural language processing module 218, an agent prompt module 219, and a call generation module 220 communicatively coupled to the at least one processor(s) 209.

In some embodiments, the natural language processing module 218 of FIG. 2 of the present disclosure, utilizes at least one speech to text learning model, described herein, to transcribe speech to text of a communication interaction session from a customer calling a call center agent.

In some embodiments, the natural language processing module 218 of the present disclosure, performs intent mapping(s) on the text transcribed from the speech of the customer calling. The NLP module 218 may utilize any one of a plurality of deep machine learning algorithms to process intent mapping(s) such as for example supervised learning based on classified data sets (e.g., pay bill, close account) to identify the appropriate mapping. In some embodiments the natural language processing module 218 automatically performs intent mapping(s) and stores the resulting data as predefined call script. The predefined call scripts may be organized by topic, and grouped according to a sample call script, for example a group of call scripts may relate to the topics, pay bill or close account. The predefined call script may be organized into a library having predefined intent mapping(s) s the predefined text, aggregating the predefined text into dialogs associated with an exemplary topic in the storage device 201. In some embodiments, the predefined call scripts may be entirely generated by a deep machine learning based natural language processing algorithm. In some embodiments, the predefined call scripts are at least in part generated by a deep machine learning based natural language processing algorithm, and at least in part generated by a person. In some embodiments the predefined call scripts may be entirely generated by a person.

In some embodiments, the agent prompt module 219 of the present disclosure utilizes at least one deep machine learning algorithm to perform intent mapping(s) on the communication interaction session text data transcribed from speech to text by the NLP module 218 of the customer's call. In some embodiments the agent prompt module 219 automatically generates a prompt based on the intent mapping(s) having predefined text and sends the prompt to the computing device of the call center agent 104.

In some embodiments, the call generation module 220 of the present disclosure utilizes at least one processor to generate virtual caller identity data. The virtual caller identity data may have at least information about a customer name, address, date of birth, social security number, and associated account details. The virtual caller identity data should be indistinguishable from a real customer in that the call center agent would not be aware that the virtual caller identity data is not real data of a customer. The call generation module 220 further utilizes at least one processor to synthesize a virtual voice to pair with the virtual call identity data. The virtual voice consistent with the virtual call identity data in that if the generated data is for example female, aged 55, from Alabama, then the call generation module 220 generates at least the appropriate tone, pitch, intonation, accent, and may incorporate personal details for example (e.g., education level, socioeconomic class, etc.). The virtual voice generated by the generation module 220 should incorporate as many factors from the virtual caller identity data as possible rendering it indistinguishable from a human voice.

In some embodiments, the GAN module 217 of the present disclosure, utilizes a least one deep machine learning algorithm, described herein, to automatically generate adversarial text transcribed from text to speech, and paired with virtual caller identity data and a virtual voice generated by at least one sub-module to maliciously re-direct a communication interaction with a call center agent. In some embodiments, the GAN module 217 utilizes a deep learning natural language processing module 218 to process speech to text spoken by a call center agent, processing the intent mapping(s) of the text, determining a response based on a similarity measure of the predefined adversarial script intent mapping(s) a malicious re-direct intent mapping(s) to present to the call center agent.

Figure 3:
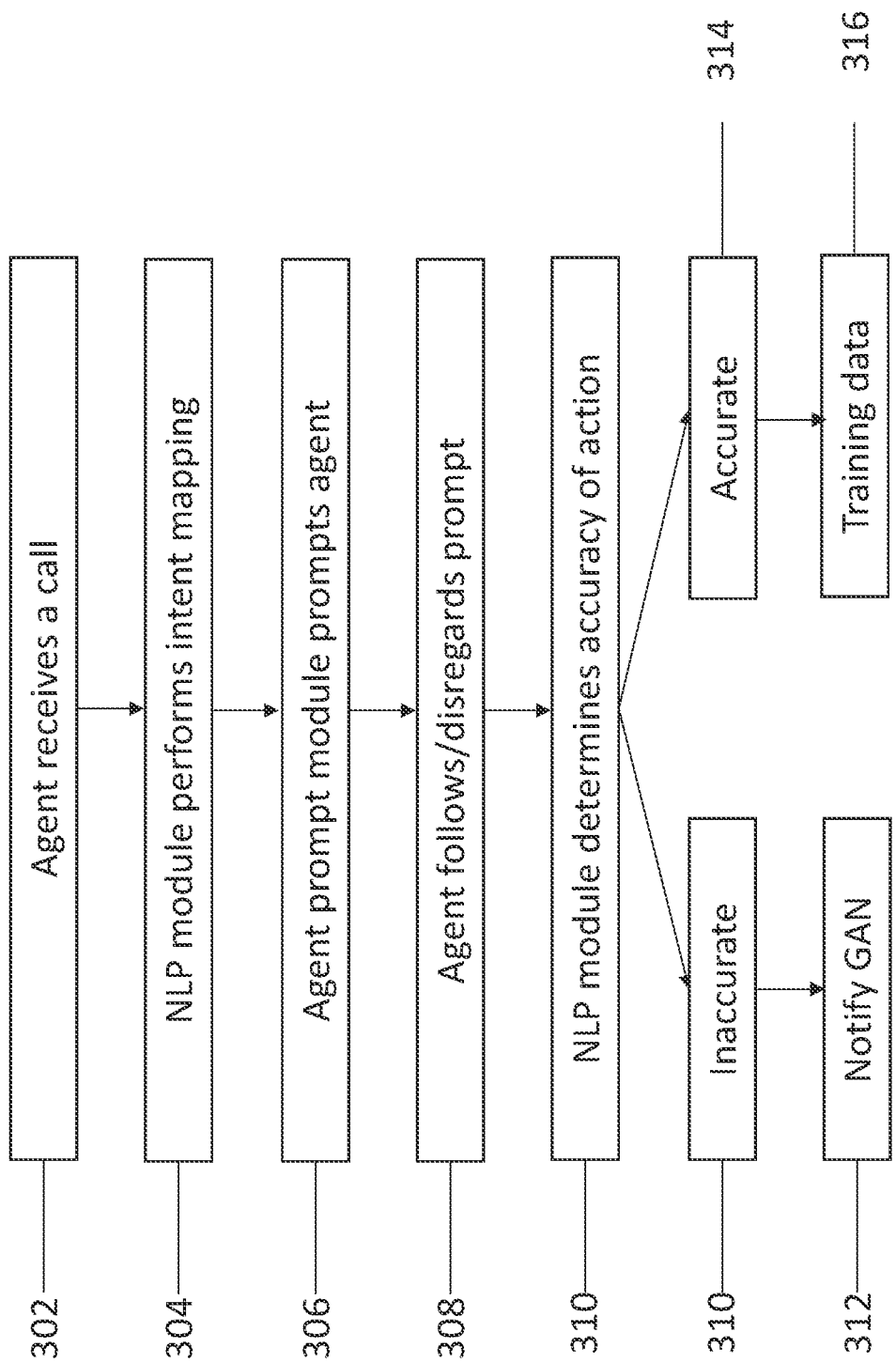
FIG. 3 is a flowchart illustrating operational steps of automatically monitoring a plurality of communication interactions, in accordance with one or more embodiments of the present disclosure.

FIG. 3 is a flowchart of Process 300 illustrating operational steps for automatically monitoring a plurality of communication interactions sessions associated with at least one call, in accordance with one or more embodiments of the present disclosure.

In Step 302, the call center agent receives a call from a customer device 102. In some embodiments the call center agent may obtain a permission from each user in the plurality of users to monitor a plurality of activities during the call. In some embodiments, the call center agent may obtain the permission from each user in the plurality of users to monitor a plurality of activities executed by the computer-based monitoring module 200. In some embodiments, the NLP module 218 may obtain the permission from the customer over the customer device 102 to monitor the communication interaction session associated with the user. In certain embodiments, the plurality of activities may refer to calling-related activities, online activities, and/or transactional activities associated with the computer-based monitoring module 200.

In Step 304, the natural language processing (NLP) module 218 may continually receive monitoring data of the plurality of activities of the call received by the agent at Step 302. The call may be related to a particular subject such as IT help, troubleshooting or account help etc. In some embodiments, the NLP module 218 utilize at least one speech-to-text deep machine learning model to transcribe a call script including text representative of the conversation script. The conversation script may be transcribed in real time or recorded and transcribed off line. The NLP module 218 may utilize at least one natural language processing deep machine learning model to generate a plurality of intent mapping(s) s associated with the conversation script transcribed to text. In some embodiments the NLP module 218 may utilize at least one deep machine learning model having a plurality of parameters configured to encode the text of the conversation script into the plurality of intent mapping(s) s to produce semantic encoding indicative of the conversation script. In some embodiments, the NLP module 218 utilizes at least one similarity measurement model to determine a semantic similarity between the predefined intent mapping(s) s and the plurality of conversation script intent mapping(s) s based at least in part on at least one similarity measure to determine semantic encoding. In some embodiments, at Step 304 the NLP module 218 determines at least one error, based on the semantic similarity of the conversation script intent mapping(s) of the plurality of intent mapping(s) s. The NLP module 218 may determine the at least one error by applying for example a threshold, a distance measure, a clustering measure, a standard deviation, or any measure capable of determining the semantic similarity of the call audio intent mapping(s) s to the plurality of intent mapping(s) s. In some embodiments the semantic similarity may be generated from intent mapping(s) s of at least a word, a group of words, a lexical phrase, or any similar configuration of words that increase the accuracy of the measurement of the semantic similarity.

In Step 306, the agent prompt module 219 receives the at least one error determined by the NLP module 218. The agent prompt module 219 may send a notification of the at least one detected error to the device of the call center agent 104, indicating the nature of the error(s). In some embodiments, the agent prompt module 219 may send a notification of the at least one detected error to an administrator or manager of the call center agent. In some embodiments the agent prompt module 219 sends a request to the NLP module 218 to utilize at least one similarity measurement model to determine a semantic similarity wherein the error is minimized between the intent mapping(s) s of the conversation script and the plurality of conversation script intent mapping(s) s where the error occurred. In some embodiments the error minimization function may be carried out by the NLP module 218 utilizing an ML module where the ML module may for example perform gradient descent or any similar loss function capable of determining a minimization error. In some embodiments, the NLP module 218 determines by the at least one processor at least one of a plurality of scripts of semantic similarity text having a minimal intent mapping(s) error. In certain embodiments, the agent prompt module 219 prompts the agent device of a call center agent 104 with the at least one of a plurality of scripts of semantic similarity text having a minimal intent mapping(s) error.

In Step 308 the call center agent determines whether to follow or disregard the prompt of at least one text having a minimal intent mapping(s) error determined by the NLP module 218. The NLP module 218 may continuously monitor by the at least one deep machine learning algorithm the conversation script utilizing at least one similarity measurement model to determine a semantic similarity between the minimal intent mapping(s) error and the plurality of conversation script intent mapping(s) s.

In Step 310 the NLP module 218 determines by the at least one processor the accuracy of the call center agent's decision based at least in part on whether at least one error between the minimal intent mapping(s) error and the plurality of conversation script intent mapping(s) s occurs. In some embodiments, the NLP module 218 at Step 310 determines that the decision of the call center agent was accurate (i.e., no error occurred) then the intent mapping(s) of the conversation script may be stored in one of network database A 112, network database B 120, or cloud platform 122 for future training purposes. In some embodiments, the NLP module 218 determines by the at least one processor that the call center agent's decision was inaccurate. The NLP module 218 determines that at least one error between the minimal intent mapping(s) error and the plurality of conversation script intent mapping(s) s occurs.

In some embodiments the NLP module 218 stores the intent mapping(s) s determined to be inaccurate in one of network database A 112, network database B 120, or cloud platform 122. In some embodiments, the NLP module 218 may notify by the at least one processor an administrator or a manager of the call center agent 104, a notification having the at least one error associated with the intent mapping(s) s of the conversation script.

In Step 312 the NLP module 218 in some embodiments the NLP module 218 determines that at least one error associated with the intent mapping(s) of the conversation script has occurred, and the agent actions are determined to be inaccurate, the NLP module 218 notifies by the at least one processor the GAN module 217 of computer-based monitoring module 200. In some embodiments the notification may have the at least one error associated with the intent mapping(s) s of the conversation script. In some embodiments, the notification may indicate a location of the conversation script intent mapping(s) s stored in any of a network database A 112, network database B 120, or cloud platform 122.

Figure 4:
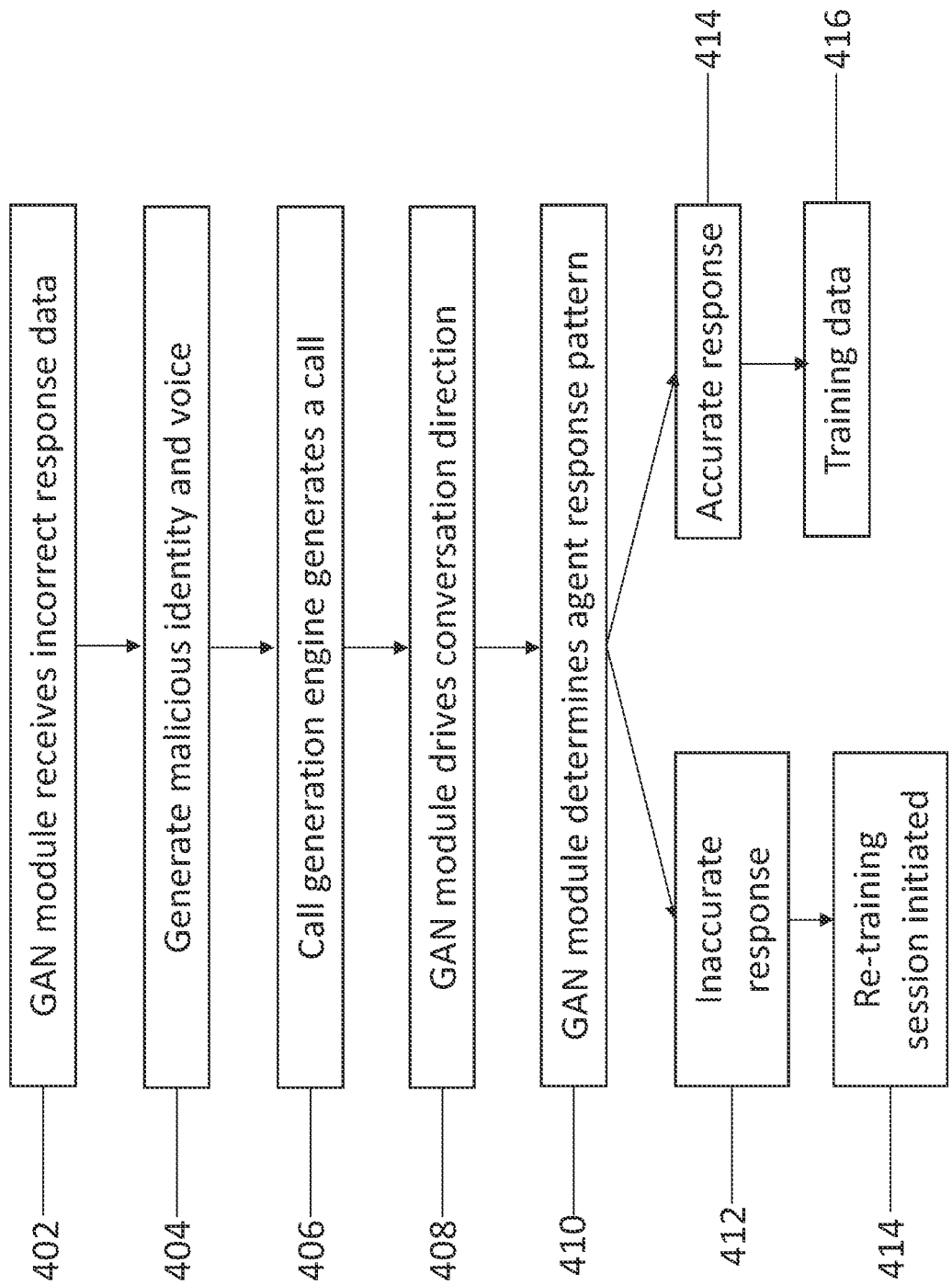
FIG. 4 is a flowchart illustrating operational steps of automatically monitoring a plurality of communication interactions, and initiating a communication interaction training session, in accordance with one or more embodiments of the present disclosure.

FIG. 4 is a flowchart of Process 400 illustrating operational steps for automatically generating and monitoring a plurality of communication interactions sessions associated with at least one call. In some embodiments, the flowchart of Process 400 illustrates the operational steps of generating at least one adversarial virtual caller identity data, generating a virtual voice that corresponds to the virtual caller identity data, initiating at least one call to a call center agent with the associated virtual caller identity data and the virtual voice, driving by the adversarial virtual caller the direction of the conversation, and determining the call center agent response pattern to the driven conversation, and determining whether to initiate a training session in response to the accuracy of the call center agent response pattern in accordance with one or more embodiments of the present disclosure.

In Step 402 the GAN module 217 having at least one deep machine learning algorithm may retrieve in real time, data associated with the incorrect responses generated by the call center agent during a call from a customer. In some embodiments, the incorrect response data may include adversarial intent mapping(s) of semantic encoding based at least in part on an error occurring between the plurality of intent mapping(s) s and the plurality of conversation script intent mapping(s) s determined by NLP module 218 or any similar deep machine learning sub-module capable of determining an error. In some embodiments the incorrect response data determined by the NLP module 218 may be aggregated into a predefined adversarial call script library. In some embodiments, the predefined adversarial call script library may include at least one error in the intent mapping(s) of semantic encoding based at least in part on an error occurring between the plurality of intent mapping(s) s and the plurality of conversation script intent mapping(s) s determined by NLP module 218, and may also include incorrect response data having a weight value, or any value that determines an order of importance. In some embodiments, the GAN module 217 retrieves the data off-line as incorrect response data of intent mapping(s) of the conversation script may be stored in one of a plurality of a network database A 112, network database B 120, or cloud platform 122.

In Step 404 the call generation module 220 of the present disclosure utilizes at least one processor to generate virtual caller identity data for a malicious adversary. The virtual caller identity data of the malicious adversary consistent with the typical caller identity data received at the console of a call center agent 104 when receiving a call from a customer device 102. The virtual caller identity data of a malicious actor may have at least information about a customer associated account details (e.g., name, address, date of birth, social security number). The call center agent should not be cognizant that the virtual caller identity data of a malicious adversary is not real customer data. In some embodiments, the call generation module 220 of the present disclosure utilizes at least one processor to generate a virtual voice to pair with the virtual call identity data of a malicious actor. The virtual voice for the malicious actor consistent with the virtual call identity data of the malicious actor. In some embodiments, the generated virtual call identity data of a malicious actor is for example, male, aged 25, from Colorado, then the call generation module 220 may determine an appropriate tone, pitch, intonation, accent, and a plurality of personal details may be incorporated as well (e.g., education level, socioeconomic class, etc.). The virtual voice generated by the generation module 220 may incorporate a plurality of factors from the virtual caller identity data of a malicious actor so as to be indistinguishable from a real customer caller.

In Step 406 the call generation module 220 utilizing at least one processor generates a call to a call center agent 104. The call generation module 220 utilizes the generated virtual caller identity data of a malicious actor and the associated virtual voice.

In Step 408, the GAN module 217 utilizing at least one speech to text deep machine learning model to transcribe a call script including text representative of the conversation script of the call initiated with the call center agent 104. In some embodiments, the GAN module 217 utilizes a plurality of adversarial intent mapping(s) s associated with responses determined to be inaccurate in Process 300 of Step 310 presenting at least one of these semantic encodings of intent mapping(s) s to the call center agent 104. In some embodiments GAN module 217 utilizes at least one deep machine learning model to generate malicious adversarial conversation script produced from semantic encodings of the intent mapping(s) s to drive the conversation with the call center agent 104 in a non-optimal manner. In certain embodiments, in response to call center agent 104 conversation script the GAN module 217 may have a plurality of parameters configured to encode the text of the conversation script into the plurality of intent mapping(s) s to produce a semantic encoding response from the plurality of intent mapping(s) s associated with responses determined to be inaccurate to test the call center agent 104 on previously inaccurate response scenarios.

In Step 410, the GAN module 217 utilizes at least one similarity measurement model to determine a semantic similarity between the plurality of adversarial intent mapping(s) s associated with responses determined to be inaccurate and the intent mapping(s) s generated by the call center agent 104. In some embodiments the GAN module 217 utilizes at least one similarity measurement model to determine a similarity. The GAN module 217 determines by the at least one processor the accuracy of the call center agent's decision based at least in part on whether at least one error between the driven intent mapping(s) error (e.g., malicious intent mapping(s), previous intent mapping(s), etc.) generated by GAN module 217 and the plurality of conversation script intent mapping(s) s of the call center agent occurs.

In Step 414 the GAN module 217 determines that the decision of the call center agent was accurate (i.e., no error occurred) in this instance intent mapping(s) of the conversation script may be stored in one of network database A 112, network database B 120, or cloud platform 122 for future training purposes. In some embodiments, the training data generated at Step 416 may be used to train other call center agents.

In some embodiments, the NLP module 218 may determine by the at least one processor that the call center agent's decision was inaccurate. The NLP module 218 may determine that at least one error between the minimal intent mapping(s) error and the plurality of conversation script intent mapping(s) s occurs.

In Step 412 the GAN module 217 by at least the one processor determines at least one error, based on the semantic similarity of the conversation script intent mapping(s) from the conversation script of the call center agent and the plurality of adversarial intent mapping(s) s generated by the GAN module 217. In some embodiments, at least one error may be determined from presenting the call center agent adversarial intent mapping(s) s from the plurality of intent mapping(s) s associated with responses determined to be inaccurate from previous conversation script of the call center agent. In some embodiments, at least one error may be determined from presenting the call center agent malicious adversarial conversation topic from semantic encodings of the intent mapping(s) s.

In Step 414 the GAN module 217 utilizes at least one processor to determine based upon a measure of inaccurate responses to accurate response during a call whether to initiate a training session. The measure utilized may be related to the intent mapping(s) s that are tested during the call, and may be but not limited to a threshold, an average a percentage, a score, or any similar measure.

In some embodiments and, optionally, in combination of any embodiment described above or below, the computer-based monitoring module 200 having at least one deep machine learning sub-module may specify a neural network by at least a neural network topology, a series of activation functions, and connection weights. For example, the topology of a neural network may include a configuration of nodes of the neural network and connections between such nodes. In some embodiments and, optionally, in combination of any embodiment described above or below, the exemplary trained neural network model may also be specified to include other parameters, including but not limited to, bias values/functions and/or aggregation functions. For example, an activation function of a node may be a step function, sine function, continuous or piecewise linear function, sigmoid function, hyperbolic tangent function, or other type of mathematical function that represents a threshold at which the node is activated. In some embodiments and, optionally, in combination of any embodiment described above or below, the exemplary aggregation function may be a mathematical function that combines (e.g., sum, product, etc.) input signals to the node. In some embodiments and, optionally, in combination of any embodiment described above or below, an output of the exemplary aggregation function may be used as input to the exemplary activation function. In some embodiments and, optionally, in combination of any embodiment described above or below, the bias may be a constant value or function that may be used by the aggregation function and/or the activation function to make the node more or less likely to be activated.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; knowledge corpus; stored audio recordings; flash memory devices; electrical, optical, acoustical or other forms of propagated signals (e.g., carrier waves, infrared signals, digital signals, etc.), and others.

As used herein, the terms "computer module" and "module" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Computer-related systems, computer systems, and systems, as used herein, include any combination of hardware and software. Examples of software may include software components, operating system software, middleware, firmware, software modules, routines, subroutines, functions, methods, procedures, software interfaces, application program interfaces (API), instruction sets, computer code, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

In some embodiments, one or more of exemplary inventive computer-based systems/platforms, exemplary inventive computer-based devices, and/or exemplary inventive computer-based components of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

As used herein, the term "server" should be understood to refer to a service point which provides processing, database, and communication facilities. By way of example, and not limitation, the term "server" may refer to a single, physical processor with associated communications and data storage and database facilities, or it may refer to a networked or clustered complex of processors and associated network and storage devices, as well as operating software and one or more database systems and application software that support the services provided by the server. In some embodiments, the server may store transactions and automatically trained deep machine learning models. Cloud servers are examples.

In some embodiments, as detailed herein, one or more of exemplary inventive computer-based systems/platforms, exemplary inventive computer-based devices, and/or exemplary inventive computer-based components of the present disclosure may obtain, manipulate, transfer, store, transform, generate, and/or output any digital object and/or data unit (e.g., from inside and/or outside of a particular application) that may be in any suitable form such as, without limitation, a file, a contact, a task, an email, a social media post, a map, an entire application (e.g., a calculator), etc. In some embodiments, as detailed herein, one or more of exemplary inventive computer-based systems/platforms, exemplary inventive computer-based devices, and/or exemplary inventive computer-based components of the present disclosure may be implemented across one or more of various computer platforms such as, but not limited to: (1) FreeBSD™, NetBSD™, OpenBSD™; (2) Linux™; (3) Microsoft Windows™; (4) OS X (MacOS)™; (5) MacOS 11™; (6) Solaris™; (7) Android™; (8) iOS™; (9) Embedded Linux™; (10) Tizen™; (11) WebOS™; (12) IBM i™; (13) IBM AIX™; (14) Binary Runtime Environment for Wireless (BREW)™; (15) Cocoa (API)™; (16) Cocoa Touch™; (17) Java Platforms™; (18) JavaFX™; (19) JavaFX Mobile;™ (20) Microsoft DirectX™; (21) .NET Framework™; (22) Silverlight™; (23) Open Web Platform™; (24) Oracle Database™; (25) Qt™; (26) Eclipse Rich Client Platform™; (27) SAP NetWeaver™; (28) Smartface™; and/or (29) Windows Runtime™.

In some embodiments, exemplary inventive computer-based systems/platforms, exemplary inventive computer-based devices, and/or exemplary inventive computer-based components of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device. In at least one embodiment, the exemplary ASR system of the present disclosure, utilizing at least one deep machine-learning model described herein, may be referred to as exemplary software.

In some embodiments, exemplary inventive computer-based systems/platforms, exemplary inventive computer-based devices, and/or exemplary inventive computer-based components of the present disclosure may be configured to handle numerous concurrent tests for software agents that may be, but is not limited to, at least 100 (e.g., but not limited to, 100-999), at least 1,000 (e.g., but not limited to, 1,000-9,999), at least 10,000 (e.g., but not limited to, 10,000-99,999), at least 100,000 (e.g., but not limited to, 100,000-999,999), at least 1,000,000 (e.g., but not limited to, 1,000,000-9,999,999), at least 10,000,000 (e.g., but not limited to, 10,000,000-99,999,999), at least 100,000,000 (e.g., but not limited to, 100,000,000-999,999,999), at least 1,000,000,000 (e.g., but not limited to, 1,000,000,000-999,999,999,999), and so on.

In some embodiments, exemplary inventive computer-based systems/platforms, exemplary inventive computer-based devices, and/or exemplary inventive computer-based components of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, and/or objects. For example, such projections may be a visual overlay for a mobile augmented reality (MAR) application.

In some embodiments, exemplary inventive computer-based systems/platforms, exemplary inventive computer-based devices, and/or exemplary inventive computer-based components of the present disclosure may be configured to be utilized in various applications which may include, but not limited to, the exemplary ASR system of the present disclosure, utilizing at least one deep machine-learning model described herein, gaming, mobile-device games, video chats, video conferences, live video streaming, video streaming and/or augmented reality applications, mobile-device messenger applications, and others similarly suitable computer-device applications.

As used herein, the term "mobile electronic device," or the like, may refer to any portable electronic device that may or may not be enabled with location tracking functionality (e.g., MAC address, Internet Protocol (IP) address, or the like). For example, a mobile electronic device may include, but is not limited to, a mobile phone, Personal Digital Assistant (PDA), Blackberry™, Pager, Smartphone, or any other reasonable mobile electronic device.

The aforementioned examples are, of course, illustrative and not restrictive.

At least some aspects of the present disclosure will now be described with reference to the following numbered clauses.

Clause 1. A method may include: retrieving, by at least one processor, a predefined call script from a predefined call script library, the predefined call script having predefined intent mappings encoding predefined text representing predefined correct dialogue associated with a sample topic; utilizing, by the at least one processor, a computer-based monitoring module to detect an error in a call script conversation based at least in part on the predefined call script;

wherein the computer-based monitoring module is configured to: utilize at least one speech-to-text deep machine learning model to transcribe a call script conversation comprising text representative of the call script conversation; utilizing, by at least one processor, at least one natural language processing deep machine learning model to generate a plurality of call intent mappings associated from the script conversation, wherein the at least one natural language processing deep machine learning model comprises a plurality of parameters configured to encode the text of the call script into the plurality of call intent mappings to produce semantic encodings indicative of call script; utilizing, by the at least one processor, at least one similarity measurement model to determine a semantic similarity between the predefined intent mappings and the plurality of call intent mappings based at least in part on at least one similarity measure;

determining, based on the semantic similarity, at least one error in at least one call intent mapping of the plurality of call intent mappings; determining, by the at least one processor, a user training need based at least in part on the at least one error; selecting, by the at least one processor, training data for a training call based at least in part on the at least one error and the script conversation; selecting, by the at least one processor, a training call voice for the training call based at least in part on the training data; initiating, by the at least one processor, the training call by calling a user and loading the training data in a user dashboard of a user computing device associated with the user; utilizing, by the at least one processor, a call generation module to automatically generate caller speech for the training call based at least in part on the training data and the training call voice; wherein the call generation module is configured to: receive user speech data representative of speech performed by a user during the training call in response to the generated caller speech; utilizing, by the at least one processor, the at least one speech-to-text deep machine learning model to transcribe a user speech script representative of the user speech data; utilizing, by the at least one processor, the at least one natural language processing deep machine learning model to generate at least one user speech intent mapping associated with the user speech data; detecting, by the at least one processor, a new error in the user speech script based at least in part on the call script and the user speech script; determining, by the at least one processor, a user training need based at least in part on, the at least one new error; and determining, by the at least one processor, a training session initiation based at least in part on the user training need and the at least one new error.

Clause 2. The method according to clause 1, where the predefined call script library is generated by a deep machine learning algorithm.

Clause 3. The method according to clause 1, or 2, where the predefined call script library is at least in part generated by a person.

Clause 4. The method according to clause 1, 2, or 3, where thcomputer-based monitoring module schedules a training session when the computer-based monitoring module detects an error.

Clause 5. The method according to clause 1, 2, or 4 where the computer-based monitoring module monitors a user call time and schedules a training session when the computer-based monitoring module detects an error and the user call time on a call exceeds a threshold.

Clause 6. The method according to clause 1, 2, 3, 4, or 5 where, the semantic similarity is determined from at least a lexical phrase of the call.

Clause 7. The method according to clause 1, 2, 3, 4, 5, or 6 where, a training session schedule of the user is determined by an administrator/manager.

Clause 8. The method according to clause 1, 2, 3, 4, 5, 6 or 7 where, upon detecting an error the computer-based monitoring module notifies an administrator/manager of the user.

Clause 9. A system may include: a non-transient computer memory, storing software instructions; and a least one processor of a first computing devices associated with a user; wherein, then at least one processor executes the software instructions, the first computing device is programmed to: retrieve, by at least one processor, a predefined call script from a predefined call script library, the predefined call script having predefined intent mappings encoding predefined text representing predefined correct dialogue associated with a sample topic; utilize, by the at least one processor, a computer-based monitoring module to detect an error in a call script conversation based at least in part on the call script; wherein the computer-based monitoring module is configured to: utilize at least one speech-to-text deep machine learning model to transcribe a call script comprising text representative of the call script of the conversation; utilize, by the at least on processor, at least one natural language processing deep machine learning model to generate a plurality of call intent mappings associated from the conversation, wherein the at least one natural language processing deep machine learning model comprises a plurality of parameters configured to encode the text of the call script into the plurality of call intent mappings to produce semantic encodings indicative of call script; utilize, by the at least one processor, at least one similarity measurement model to determine a semantic similarity between the predefined intent mappings and the plurality of call intent mappings based at least in part on at least one similarity measure; determining, based on the semantic similarity, at least one error in at least one call intent mapping of the plurality of call intent mappings; determine, by the at least one processor, a user training need based at least in part on the at least one error; select, by the at least one processor, training data for a training call based at least in part on the at least one error and the topic; select, by the at least one processor, a training call voice for the training call based at least in part on the training data; initiate, by the at least one processor, the training call by calling the user and loading the training data in a user dashboard of a user computing device associated with the user; utilize, by the at least one processor, a call generation module to automatically generate caller speech for the training call based at least in part on the training data and the training call voice; wherein the call generation module is configured to: receive user speech data representative of speech performed by the user during the training call in response to the generated caller speech; utilize, by the at least one processor, the at least one speech-to-text deep machine learning model to transcribe a user speech script representative of the user speech data; utilize, by the at least one processor, the at least one natural language processing deep machine learning model to generate at least one user speech intent mapping associated with the user speech data; detect, by the at least one processor, a new error in the user speech script based at least in part on the call script and the user speech script; determine, by the at least one processor, a user training need based at least in part on the at least one new error; and determine, by the at least one processor, a training call initiation based at least in part on the user training need and the at least one new error.

Clause 10. The system according to clause 9, where the predefined call script library is generated by a deep machine learning algorithm.

Clause 11. The system according to clause 9, or 10, where the predefined call script library is at least in part generated by a person.

Clause 12. The system according to clause 9, 10, or 11, where the computer-based monitoring module schedules a training session when an error is detected.

Clause 13. The method according to clause 9, 10, 11, or 12, where the computer-based monitoring module monitors a user call time and schedules a training session when the computer-based monitoring module detects an error and the user call time exceeds a threshold.

Clause 14. The method according to clause 9, 10, 11, 12 or 13, where, wherein the semantic similarity is determined from at least a lexical phrase of the call.

Clause 15. The method according to clause 9, 10, 11, 12, 13, or 14, where, a training session schedule of the user is determined by an administrator/manager.

Clause 16. The method according to clause 9, 10, 11, 12, 13, 14, or 15, where, upon detecting an error a notification is sent to an administrator/manager of the user.

Clause 17. A method may include: retrieving, by at least one processor, a predefined call script from a predefined call script library, the predefined call script having predefined intent mappings encoding predefined text representing predefined dialogue associated with a sample topic; utilizing, by the at least one processor, a computer-based monitoring module to detect an error in a call script based at least in part on the call script; wherein the computer-based monitoring module is configured to: utilize at least one speech-to-text deep machine learning model to transcribe a call script conversation comprising text representative of the call script conversation; utilizing, by the at least on processor, at least one natural language processing generative adversarial network deep machine learning model to generate a plurality of adversarial call intent mappings associated from the conversation, wherein the at least one natural language processing generative adversarial network deep machine learning model comprises a plurality of parameters configured to encode the text of the call script into the plurality of adversarial call intent mappings to produce semantic encodings indicative of a adversarial call script; utilizing, by the at least one processor, at least one similarity measurement model to determine a semantic similarity between the predefined adversarial intent mappings and the plurality of call intent mappings based at least in part on at least one similarity measure; determining, based on the semantic similarity, at least one error in at least one call intent mapping of the plurality of call intent mappings; determining, by the at least one processor, a user training need based at least in part on the at least one error; selecting, by the at least one processor, training data for a training call based at least in part on the at least one error and the topic; selecting, by the at least one processor, a training call voice for the training call based at least in part on the training data; initiating, by the at least one processor, the training call by calling the user and loading the training data in a user dashboard of a user computing device associated with the user;

utilizing, by the at least one processor, a call generation module to automatically generate caller speech for the training call based at least in part on the training data and the training call voice; wherein the call generation module is configured to: receive user speech data representative of speech performed by the user during the training call in response to the generated caller speech; utilizing, by the at least one processor, the at least one speech-to-text deep machine learning model to transcribe a user speech script representative of the user speech data; utilizing, by the at least one processor, the at least one natural language processing deep machine learning model to generate at least one user speech intent mapping associated with the user speech data; detecting, by the at least one processor, a new error in the user speech script based at least in part on the call script and the user speech script; determining, by the at least one processor, a user training need based at least in part on, the at least one new error; and determining, by the at least one processor, a training call initiation based at least in part on the user training need and the at least one new error.

Clause 18. The computer-implemented method of clause 17, wherein the computer-based monitoring module is a generative adversarial network module the predefined call script is a predefined adversarial script and wherein determining, based on the semantic similarity is determined based on intent mappings of a predefined adversarial script.

Clause 19. The computer-implemented method of clause 17, or 18 wherein the predefined adversarial call script library is generated by a deep machine learning algorithm.

Clause 20. The computer-implemented method of clause 17, 18, or 19 wherein the predefined adversarial call script library is at least in part generated by a person.

Clause 21. The computer-implemented method of clause 17, 18, 19, or 20 wherein the plurality of conversations having a specific intent mapping are determined to be an important topic.

While one or more embodiments of the present disclosure have been described, it is understood that these embodiments are illustrative only, and not restrictive, and that many modifications may become apparent to those of ordinary skill in the art, including that various embodiments of the inventive methodologies, the inventive systems/platforms, and the inventive devices described herein may be utilized in any combination with each other. Further still, the various steps may be carried out in any desired order (and any desired steps may be added and/or any desired steps may be eliminated).

What is claimed:

1. A computer-implemented method comprising:

retrieving, by at least one processor, a predefined call script from a predefined call script library, the predefined call script having predefined intent mappings encoding predefined text representing predefined correct dialogue associated with a sample topic;

utilizing, by the at least one processor, a computer-based monitoring module to detect an error in a call script conversation based at least in part on the predefined call script;

wherein the computer-based monitoring module is configured to: utilize at least one speech-to-text deep machine learning model to transcribe a call script conversation comprising text representative of the call script conversation;

utilizing, by at least one processor, at least one natural language processing deep machine learning model to generate a plurality of call intent mappings associated from the script conversation, wherein the at least one natural language processing deep machine learning model comprises a plurality of parameters configured to encode the text of the call script into the plurality of call intent mappings to produce semantic encodings indicative of call script;

utilizing, by the at least one processor, at least one similarity measurement model to determine a semantic similarity between the predefined intent mappings and the plurality of call intent mappings based at least in part on at least one similarity measure;

determining, based on the semantic similarity, at least one error in at least one call intent mapping of the plurality of call intent mappings;

determining, by the at least one processor, a user training need based at least in part on the at least one error;

selecting, by the at least one processor, training data for a training call based at least in part on the at least one error and the script conversation;

selecting, by the at least one processor, a training call voice for the training call based at least in part on the training data;

initiating, by the at least one processor, the training call by calling a user and loading the training data in a user dashboard of a user computing device associated with the user;

utilizing, by the at least one processor, a call generation module to automatically generate caller speech for the training call based at least in part on the training data and the training call voice;

wherein the call generation module is configured to: receive user speech data representative of speech performed by a user during the training call in response to the generated caller speech;

utilizing, by the at least one processor, the at least one speech-to-text deep machine learning model to transcribe a user speech script representative of the user speech data;

utilizing, by the at least one processor, the at least one natural language processing deep machine learning model to generate at least one user speech intent mapping associated with the user speech data;

detecting, by the at least one processor, a new error in the user speech script based at least in part on the call script and the user speech script;

determining, by the at least one processor, a user training need based at least in part on, the at least one new error; and determining, by the at least one processor, a training session initiation based at least in part on the user training need and the at least one new error.

2. The computer-implemented method of claim 1, wherein the predefined call script library is generated by a deep machine learning algorithm.

3. The computer-implemented method of claim 1, wherein the predefined call script library is at least in part generated by a person.

4. The computer-implemented method of claim 1, wherein the computer-based monitoring module schedules a training session when the computer-based monitoring module detects an error.

5. The computer-implemented method of claim 1, wherein the computer-based monitoring module monitors a user call time and schedules a training session when the computer-based monitoring module detects an error and the user call time on call exceeds a threshold.

6. The computer-implemented method of claim 1, wherein the semantic similarity is determined from at least a lexical phrase of the call.

7. A computer-implemented method according to claim 1, wherein a training session schedule of the user is determined by an administrator/manager.

8. A computer-implemented method according to claim 1, wherein upon detecting an error the computer-based monitoring module notifies an administrator/manager of the user.

9. A system comprising:
a non-transient computer memory, storing software instructions; and
a least one processor of a first computing devices associated with a user;
wherein, then at least one processor executes the software instructions, the first computing device is programmed to:
retrieve, by at least one processor, a predefined call script from a predefined call script library, the predefined call script having predefined intent mappings encoding predefined text representing predefined correct dialogue associated with a sample topic;
utilize, by the at least one processor, a computer-based monitoring module to detect an error in a call script conversation based at least in part on the call script;
wherein the computer-based monitoring module is configured to: utilize at least one speech-to-text deep machine learning model to transcribe a call script comprising text representative of the call script of the conversation;
utilize, by the at least on processor, at least one natural language processing deep machine learning model to generate a plurality of call intent mappings associated from the conversation, wherein the at least one natural language processing deep machine learning model comprises a plurality of parameters configured to encode the text of the call script into the plurality of call intent mappings to produce semantic encodings indicative of call script;
utilize, by the at least one processor, at least one similarity measurement model to determine a semantic similarity between the predefined intent mappings and the plurality of call intent mappings based at least in part on at least one similarity measure;
determining, based on the semantic similarity, at least one error in at least one call intent mapping of the plurality of call intent mappings;
determine, by the at least one processor, a user training need based at least in part on the at least one error;
select, by the at least one processor, training data for a training call based at least in part on the at least one error and the topic;
select, by the at least one processor, a training call voice for the training call based at least in part on the training data;
initiate, by the at least one processor, the training call by calling the user and loading the training data in a user dashboard of a user computing device associated with the user;
utilize, by the at least one processor, a call generation module to automatically generate caller speech for the training call based at least in part on the training data and the training call voice;
wherein the call generation module is configured to: receive user speech data representative of speech performed by the user during the training call in response to the generated caller speech;
utilize, by the at least one processor, the at least one speech-to-text deep machine learning model to transcribe a user speech script representative of the user speech data;
utilize, by the at least one processor, the at least one natural language processing deep machine learning model to generate at least one user speech intent mapping associated with the user speech data;
detect, by the at least one processor, a new error in the user speech script based at least in part on the call script and the user speech script;
determine, by the at least one processor, a user training need based at least in part on the at least one new error; and
determine, by the at least one processor, a training call initiation based at least in part on the user training need and the at least one new error.

10. The system of claim 9, wherein the predefined call script library is generated by a deep machine learning algorithm.

11. The system of claim 9, wherein the predefined call script library is at least in part generated by a person.

12. The system of claim 9, wherein the computer-based monitoring module schedules a training session when an error is detected.

13. The system of claim 9, wherein the computer-based monitoring module monitors a user call time and schedules a training session when the computer-based monitoring module detects an error and the user call time exceeds a threshold.

14. The system of claim 9, wherein the semantic similarity is determined from at least a lexical phrase of the call.

15. A system of claim 9, wherein a training session schedule of the user is determined by an administrator/manager.

16. A system of claim 9, wherein upon detecting an error a notification is sent to an administrator/manager of the user.

17. A computer-implemented method comprising:
retrieving, by at least one processor, a predefined call script from a predefined call script library, the predefined call script having predefined intent mappings encoding predefined text representing predefined dialogue associated with a sample topic;
utilizing, by the at least one processor, a computer-based monitoring module to detect an error in a call script based at least in part on the call script;
wherein the computer-based monitoring module is configured to: utilize at least one speech-to-text deep machine learning model to transcribe a call script conversation comprising text representative of the call script conversation;
utilizing, by the at least on processor, at least one natural language processing generative adversarial network deep machine learning model to generate a plurality of adversarial call intent mappings associated from the conversation, wherein the at least one natural language processing generative adversarial network deep machine learning model comprises a plurality of parameters configured to encode the text of the call script into the plurality of adversarial call intent mappings to produce semantic encodings indicative of an adversarial call script;
utilizing, by the at least one processor, at least one similarity measurement model to determine a semantic similarity between the predefined adversarial intent mappings and the plurality of call intent mappings based at least in part on at least one similarity measure;

determining, based on the semantic similarity, at least one error in at least one call intent mapping of the plurality of call intent mappings;

determining, by the at least one processor, a user training need based at least in part on the at least one error;

selecting, by the at least one processor, training data for a training call based at least in part on the at least one error and the topic;

selecting, by the at least one processor, a training call voice for the training call based at least in part on the training data;

initiating, by the at least one processor, the training call by calling the user and loading the training data in a user dashboard of a user computing device associated with the user;

utilizing, by the at least one processor, a call generation module to automatically generate caller speech for the training call based at least in part on the training data and the training call voice;

wherein the call generation module is configured to: receive user speech data representative of speech performed by the user during the training call in response to the generated caller speech;

utilizing, by the at least one processor, the at least one speech-to-text deep machine learning model to transcribe a user speech script representative of the user speech data;

utilizing, by the at least one processor, the at least one natural language processing deep machine learning model to generate at least one user speech intent mapping associated with the user speech data;

detecting, by the at least one processor, a new error in the user speech script based at least in part on the call script and the user speech script;

determining, by the at least one processor, a user training need based at least in part on, the at least one new error; and determining, by the at least one processor, a training call initiation based at least in part on the user training need and the at least one new error.

18. The computer-implemented method of claim 17, wherein the computer-based monitoring module is a generative adversarial network module the predefined call script is a predefined adversarial script and wherein determining, based on the semantic similarity is determined based on intent mappings of a predefined adversarial script.

19. The computer-implemented method of claim 17, wherein the predefined adversarial call script library is generated by a deep machine learning algorithm.

20. The computer-implemented method of claim 17, wherein the predefined adversarial call script library is at least in part generated by a person.

21. The computer-implemented method of claim 17, wherein a plurality of conversations having an adversarial intent mapping are determined to be an important topic.

* * * * *